(12) United States Patent
Dye et al.

(10) Patent No.: US 10,913,232 B2
(45) Date of Patent: Feb. 9, 2021

(54) CELLULAR LOAD-RESPONSIVE MULTILAYER INSULATION

(71) Applicant: Quest Thermal Group LLC, Arvada, CO (US)

(72) Inventors: Scott A. Dye, Morrison, CO (US); Phillip N. Tyler, Westminster, CO (US); Alan B. Kopelove, Evergreen, CO (US)

(73) Assignee: Quest Thermal Group LLC, Arvada, CO (US)

( * ) Notice: Subject to any disclaimer, the term of this patent is extended or adjusted under 35 U.S.C. 154(b) by 764 days.

(21) Appl. No.: 15/691,059

(22) Filed: Aug. 30, 2017

(65) Prior Publication Data

US 2018/0057190 A1 Mar. 1, 2018

Related U.S. Application Data

(60) Provisional application No. 62/381,465, filed on Aug. 30, 2016.

(51) Int. Cl.
*B32B 1/02* (2006.01)
*B32B 15/04* (2006.01)
(Continued)

(52) U.S. Cl.
CPC .................. *B32B 1/02* (2013.01); *B32B 1/08* (2013.01); *B32B 7/05* (2019.01); *B32B 15/01* (2013.01);
(Continued)

(58) Field of Classification Search
CPC .... B32B 1/02; B32B 1/08; B32B 7/05; B32B 15/01; B32B 15/04; B32B 15/20;
(Continued)

(56) References Cited

U.S. PATENT DOCUMENTS 3,616,139 A 10/1971 Jones
3,649,426 A 3/1972 Gates et al.
(Continued)

FOREIGN PATENT DOCUMENTS

GB 2291672 1/1996
WO WO 2004020895 3/2004
WO WO 2011002628 1/2011

OTHER PUBLICATIONS

Getty, G. C. et al., "Experimental Evaluation of Some Selected Lightweight Superinsulation for Space Vehicles," Advances in Cryogenic Engineering, vol. 11, pp. 35-48, 1996.
(Continued)

*Primary Examiner* — Walter Aughenbaugh
(74) *Attorney, Agent, or Firm* — Polsinelli PC

(57) ABSTRACT

An insulation panel includes a face sheet hermetically coupled to a plurality of structural walls to define a plurality of cell bodies, with each cell body positioned contiguously with an adjacent cell body. An insulation structure is disposed within each cell body and further includes a first radiant barrier layer, a second radiant barrier layer, and a spacer disposed between the first radiant barrier layer and the second radiant barrier layer. Sealed cells formed by completing the cell bodies may contain a gas that condenses or freezes in response to cryogenic cooling of a structure to which the insulation panel is coupled. Load-responsive spacers may also be disposed between the insulation structure and the face sheet to support the face sheet while in atmospheric conditions and to disengage from the face sheet in low pressure environments, such as space.

20 Claims, 13 Drawing Sheets

(51) Int. Cl.
| | |
|---|---|
| *F16L 59/07* | (2006.01) |
| *B64G 1/54* | (2006.01) |
| *B64G 1/58* | (2006.01) |
| *F16L 59/12* | (2006.01) |
| *B64G 1/40* | (2006.01) |
| *F16L 59/065* | (2006.01) |
| *F16L 59/02* | (2006.01) |
| *B64G 1/50* | (2006.01) |
| *B32B 15/01* | (2006.01) |
| *B32B 1/08* | (2006.01) |
| *B32B 15/20* | (2006.01) |
| *B32B 7/05* | (2019.01) |
| *F16L 59/06* | (2006.01) |
| *F16L 59/14* | (2006.01) |

(52) U.S. Cl.
CPC .............. *B32B 15/04* (2013.01); *B32B 15/20* (2013.01); *B64G 1/40* (2013.01); *B64G 1/50* (2013.01); *B64G 1/546* (2013.01); *B64G 1/58* (2013.01); *F16L 59/02* (2013.01); *F16L 59/027* (2013.01); *F16L 59/029* (2013.01); *F16L 59/065* (2013.01); *F16L 59/07* (2013.01); *F16L 59/12* (2013.01); *F16L 59/06* (2013.01); *F16L 59/141* (2013.01)

(58) Field of Classification Search
CPC ......... F16L 59/02; F16L 59/029; F16L 59/04; F16L 59/06; F16L 59/07; F16L 59/08; F16L 59/12
See application file for complete search history.

(56) References Cited

U.S. PATENT DOCUMENTS

| | | | |
|---|---|---|---|
| 3,799,056 A | 3/1974 | Colignon | |
| 3,884,646 A | 5/1975 | Kenney | |
| 3,894,372 A | 7/1975 | Roberts et al. | |
| 3,904,379 A * | 9/1975 | Oser | F16L 59/07 428/591 |
| 3,941,964 A | 3/1976 | Yoder | |
| 4,336,292 A | 6/1982 | Blair | |
| 4,400,927 A | 8/1983 | Wolde-Tinase | |
| 4,683,154 A | 7/1987 | Benson et al. | |
| 4,707,393 A | 11/1987 | Vetter | |
| 5,038,693 A | 8/1991 | Kourtides et al. | |
| 5,100,725 A | 3/1992 | Pearson | |
| 5,107,649 A | 4/1992 | Benson et al. | |
| 5,157,893 A | 10/1992 | Benson et al. | |
| 5,175,975 A | 1/1993 | Benson et al. | |
| 5,230,941 A | 7/1993 | Hollander et al. | |
| 5,246,759 A | 9/1993 | Keller | |
| 5,270,092 A | 12/1993 | Griffith et al. | |
| 5,318,108 A | 6/1994 | Benson et al. | |
| 5,429,851 A | 7/1995 | Sallee | |
| 5,433,056 A | 7/1995 | Benson et al. | |
| 5,489,321 A | 2/1996 | Tracy et al. | |
| 5,502,292 A | 3/1996 | Pernicka et al. | |
| 5,562,154 A | 10/1996 | Benson et al. | |
| 5,580,620 A | 12/1996 | Campbell et al. | |
| 5,792,539 A | 8/1998 | Hunter | |
| 5,966,888 A | 10/1999 | Richardson | |
| 6,280,814 B1 | 8/2001 | Offermann et al. | |
| 6,423,918 B1 | 7/2002 | King et al. | |
| 6,427,945 B1 | 8/2002 | Bansemir | |
| 6,485,805 B1 | 11/2002 | Smith et al. | |
| 6,739,104 B2 | 5/2004 | Tokonabe et al. | |
| 6,860,082 B1 | 3/2005 | Yamamoto et al. | |
| 7,001,656 B2 | 2/2006 | Maignan et al. | |
| 7,111,752 B2 | 9/2006 | Bucher et al. | |
| 7,169,459 B2 | 1/2007 | Lichodziejewski et al. | |
| 7,288,326 B2 | 10/2007 | Elzey et al. | |
| 7,296,769 B2 | 11/2007 | Hogenson et al. | |
| 7,763,272 B2 | 7/2010 | Offermann et al. | |
| 7,954,301 B2 | 6/2011 | Mills | |
| 8,234,835 B2 | 8/2012 | Dye et al. | |
| 9,958,105 B1 | 5/2018 | Dye et al. | |
| 2007/0089989 A1 | 4/2007 | Hoagland et al. | |

OTHER PUBLICATIONS

Keller, C. W. et al., "Final Report: Thermal Performance of Multilayer Insulations", Lockheed Missiles & Space Co., Prepared for the National Aeronautics and Space Administration, 432 pages (1974).

Murrill, M. B., "Solar System's Best-Outfitted Spacecraft Dons Its Thermal Cloak," California Institute of Technology Press Release, Jan. 3, 1997, NASA, Pasadena, California, <https://saturn.jpl.nasa.gov/news/2154/solar-systems-best-outfitted-spacecraft-dons-its-thermal-cloak/>.

Doody, D., "Typical Onboard Systems", Basics of Space Flight, Chapter 11, Feb. 2001, California Institute of Technology, NASA, Pasadena, California.

Stultz, J. W. et al., Test-Derived Effective Emittance for Cassini M1.] Blankets and Heat Loss Characteristics in the Vicinity of Seams, Abstract, Jun. 1995, California Institute of Technology, Pasadena, California.

Donabedian, M. et al. "Chapter 5: Insulation", Satellite Thermal Control Handbook (David G. Gilmore, ed.), The Aerospace Corporation, El Segundo, California, 24 pages (2002).

Multi-Layer Insulation, Wikipedia, last modified Sep. 4, 2017, Wikipedia Foundation, Inc. <http://en.wikipedia.org/wiki/Multi-layer_insulation>.

* cited by examiner

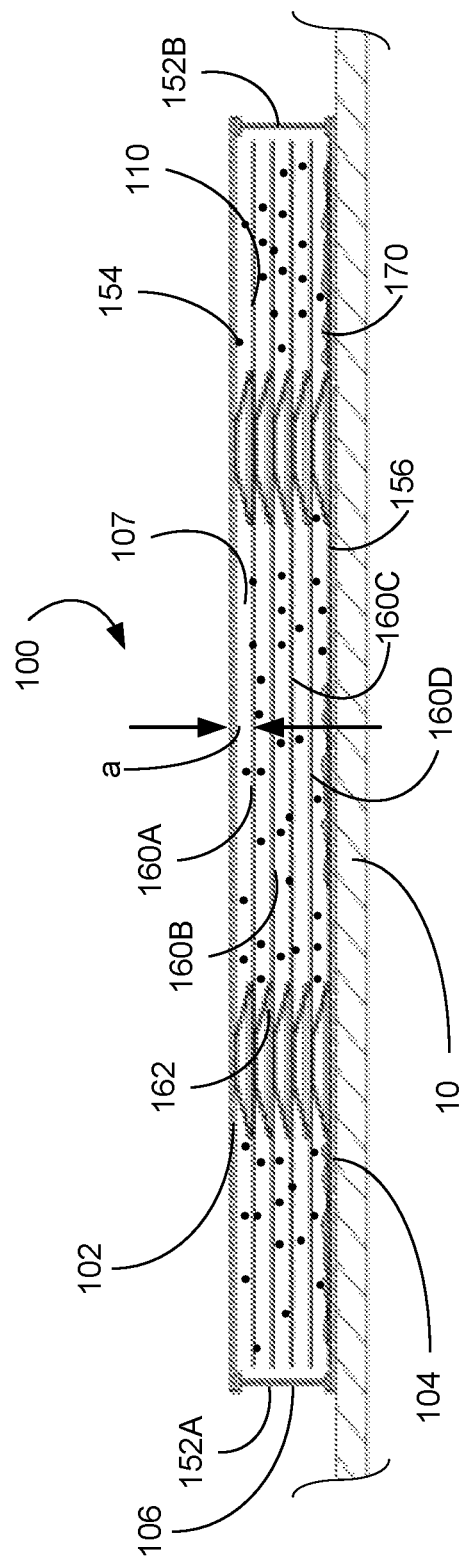

CELLULAR LOAD-RESPONSIVE MULTILAYER INSULATION

CROSS-REFERENCE TO RELATED APPLICATION

This application is related to and claims priority under 35 U.S.C. § 119(e) from U.S. Patent Application No. 62/381,465, filed Aug. 30, 2016, entitled "Cellular Load Responsive MLI: Structural In-air and In-space $LH_2$ Insulation," the entire contents of which are hereby incorporated by reference for all purposes.

STATEMENT REGARDING FEDERALLY SPONSORED RESEARCH OR DEVELOPMENT

This invention was made with government support under contract numbers NNX14CM37P and NNX15CM13C awarded by the National Aeronautics and Space Administration. The government has certain rights in the invention.

FIELD

The present invention relates generally to thermal insulation and, more specifically, to thermal multilayer insulation (MLI) for use in atmospheric and space applications.

BACKGROUND

Future space exploration, including transport to Earth orbit, the moon, Mars, and beyond, will require advances in propulsion systems to support exploration, to reduce travel time, and to reduce acquisition and operational costs. Currently, cryogenic propellants have a higher energy density than many conventional chemical rocket fuels and, as a result, are used in most National Aeronautics and Space Administration (NASA) and commercial launch vehicles to power such vehicles during ascent and subsequent space exploration. Although high in energy density, cryogenic propellants must be kept cold to preserve their integrity and to prevent boil-off losses. Accordingly, vehicles that rely on cryogenic propellants must have high performing thermal insulation to protect the cryogenic propellant. Improvements in cryogenic propellant storage and transfer are a critical need for future NASA and commercial space missions; particularly as such missions involve longer durations, higher orbits, and distances deeper into space, with zero boil-off of cryogenic propellant being an important goal.

With these thoughts in mind, among others, aspects of the systems and methods disclosed herein were conceived.

SUMMARY

According to one aspect of the present disclosure, an insulation panel is provided that includes a face sheet. A plurality of structural walls are hermetically coupled with the face sheet such that, in combination with respective portions of the face sheet, the plurality of structural walls define a plurality of cell bodies, with each cell body positioned contiguously with an adjacent cell body. An insulation structure is disposed within each of the plurality of cell bodies, each insulation structure including a first radiant barrier layer, a second radiant barrier layer, and a spacer disposed between the first radiant barrier layer and the second radiant barrier layer.

According to another aspect of the present disclosure, an insulated structure is provided. The insulated structure includes a structure wall to which an insulation panel is coupled. The insulation panel includes a face sheet and a plurality of structural walls hermetically coupled with the face sheet. In combination with respective portions of the face sheet, the plurality of structural walls define a plurality of cell bodies, with each cell body positioned contiguously with an adjacent cell body. An insulation structure is disposed within each of the plurality of cell bodies, each insulation structure including a first radiant barrier layer, a second radiant barrier layer, and a spacer disposed between the first radiant barrier layer and the second radiant barrier layer. In certain implementations, a second insulation panel including a second face sheet is coupled to the structure wall such that the first insulation panel and the second insulation panel form a gap therebetween. A face seam sheet is hermetically coupled to each of the first insulation panel and the second insulation panel and extends across the gap to define a hermetically sealed volume.

In yet another aspect of the present disclosure, an insulation panel is provided. The insulation panel includes a structural core defining a contiguous plurality of hermetically sealed cells. A first radiant barrier layer is disposed within each of the hermetically sealed cells. Each of the hermetically sealed cells further contains gas selected to at least one of condense and freeze in response to cryogenic cooling of a structure to which the insulation panel is coupled, thereby causing self-evacuation of the respective hermetically sealed cell.

BRIEF DESCRIPTION OF THE FIGURES

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

FIG. 5 is a cross-sectional view of the first CLRMLI panel coupled to a structure with a top face sheet in an unloaded state.

DETAILED DESCRIPTION

Figure 1A:
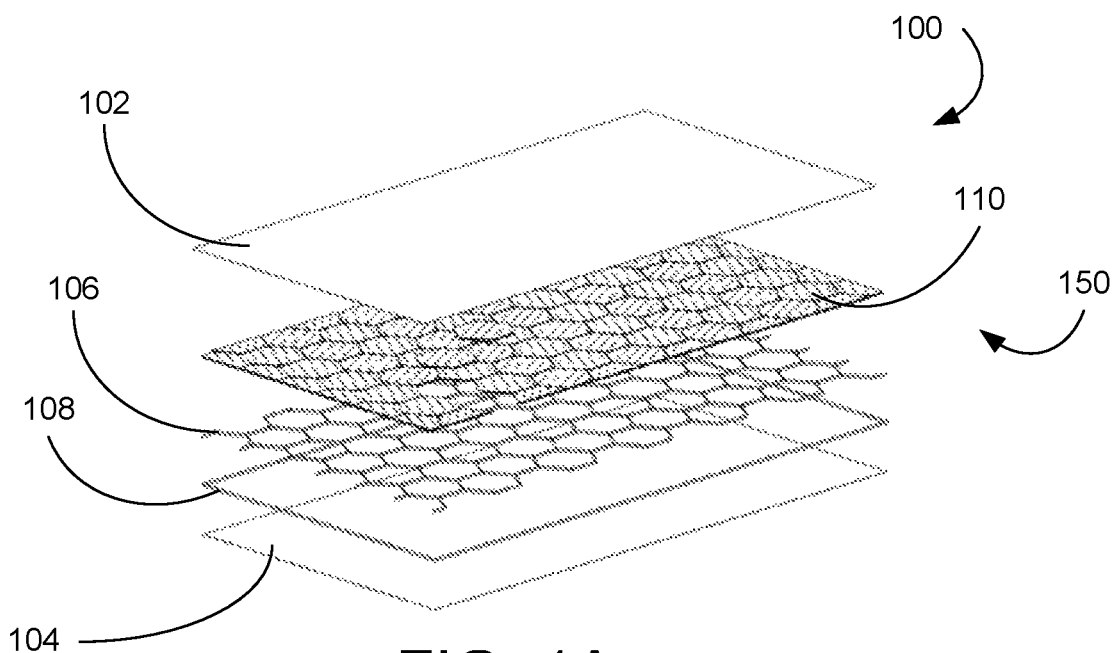
FIGS. 1A-B are isometric exploded views of a first cellular load-responsive multilayer insulation (CLRMLI) panel according to the present disclosure.

Aspects of the present disclosure involve thermal insulation and, more particularly, multilayer insulation designed for use in both atmospheric and space applications.

One limitation of conventional insulation materials is the inability of such conventional materials to provide adequate performance in both atmospheric and in-space conditions. The increasing demands of space flight, however, require insulation that performs well both in atmosphere, such as during launch preparation, as well as in space in order to facilitate the extended flight durations and greater distances involved in travelling to deeper orbits, the moon, Mars, and beyond.

Conventional launch vehicles generally use Spray on Foam Insulation (SOFI), aerogel blankets, and honeycomb core materials for insulation. There are a number of disadvantages with each of these conventional approaches. For example, conventional insulation materials may suffer from high weight-to-thermal performance ratios, structural instability, and ice or moisture buildup that can add significant liftoff mass. Moreover, many conventional insulation materials also perform inconsistently in atmospheric and space conditions.

Honeycomb core materials, which were used on early Apollo launch vehicles, were a substantial step in insulation technology. However, honeycomb core materials are difficult to work with, do not eliminate surface frosting, and can be difficult to attach to a propellant tank or vessel wall. Conventional honeycomb panel materials also have relatively high thermal conduction due to their construction and are also relatively heavy as compared to more modern insulation materials.

SOFI was developed in response to the shortcomings of honeycomb core insulation and is widely used on current launch vehicles due to its light weight and reasonable performance in atmosphere. However, SOFI has several disadvantages including a relatively high thermal conductivity (0.022 W/(m·K)) which allows high heat leak during ground hold and a lack of structural integrity that readily leads to cracking and degradation after application. SOFI is also prone to absorbing water from atmospheric humidity, which can significantly increase liftoff mass.

Further advancements in insulation materials have brought additional insulation alternatives such as aerogel. However, aerogel is generally incapable of withstanding exposure to the conditions of the launch ascent environment, has only modest atmospheric performance (0.019 W/(m·K)), and is relatively heavy for launch vehicle use.

Multilayer insulation (MLI) generally demonstrates strong thermal performance (in some cases having an apparent thermal conductivity that can be up to 10 times lower than other conventional insulation systems) but requires a deep vacuum ($<10^{-4}$ torr) in order to perform optimally. The shells required to support such low pressures in air are undesirably heavy for use on launch vehicles (generally having an area density of greater than 10 kg/m²) and absent such shells, MLI provides poor thermal insulation that is unsuitable for atmospheric use.

In light of the foregoing shortcomings, conventional insulation materials are generally ill-suited for modern spacecraft and, in particular, modern spacecraft that rely on cryogenic propellants such as, without limitation, liquid hydrogen (LH2), liquid oxygen (LOX), liquefied natural gas (LNG), and liquid methane (LCH4). More specifically, conventional insulation materials are unable to achieve the necessary insulation requirements in both atmospheric and in-space conditions or are unable to do so without presenting additional issues including, among other things, prohibitive increases in launch weight (due to the insulation itself or ice build-up) and decreased structural reliability.

Disclosed herein is a multilayer insulation (MLI) referred to as Cellular Load-Responsive Multilayer Insulation (CLRMLI) that can provide high thermal performance in both atmospheric and in-space environments. CLRMLI provides the high performance of MLI within an evacuated or self-evacuating hermetically sealed lightweight cellular core. As a result, CLRMLI provides significantly better performance than conventional insulation materials helping to meet the low heat flux and reduced boil-off requirements of modern and future space flight missions.

CLRMLI generally includes a layer of hermetically sealed cells disposed between two face sheets or a face sheet and a body of a structure, such as a tank, to which the insulation is coupled. An MLI panel including multiple layers of radiant barrier material is disposed within each hermetically sealed cell. The layers of the MLI are separated by spacers that may include multiple load-responsive spacers or layers of filler material such that adjacent radiant barrier layers are prevented from contacting each other and producing a thermal short. Spacers may also be disposed between the MLI panel and the outer face sheet to prevent contact between the face sheet and the layers of the MLI panel.

To improve the insulating properties, each hermetically sealed cell may be evacuated during manufacturing. Alternatively, each hermetically sealed cell may be self-evacuating such that as the CLRMLI panel is cooled through contact with a cryogenically cooled surface, such as a surface of a tank of ILH2, liquid LOX, LNG, LCH4, or other cryogenic propellant, an internal vacuum is formed within the panel cells, thereby increasing the insulative properties of the CLRMLI panel. For example, in one implementation, a gas is introduced into each hermetically sealed cell such that each hermetically sealed cell functions as a cryopump. As the interior face sheet or tank body is cooled, the gas within each of the hermetically sealed cells condenses or freezes, thereby reducing pressure within the hermetically sealed cell to vacuum or near vacuum levels. To further facilitate evacuation or self-evacuation of the hermetically sealed cells, a getter may also be included in each hermetically sealed cell to react with or otherwise adsorb gas molecules that may be within the cell. Once adequate vacuum levels are achieved within a cell of the CLRMLI panel, convection and gas conduction is significantly reduced or eliminated and heat conduction through the CLRMLI panel is limited to solid conduction and radiation.

The structural core of CLRMLI is designed to minimize solid conduction through the walls of the core structure through wall placement and material selection while maintaining sufficient structural integrity to support the face sheet of the CLRMLI panel under external atmospheric pressure loads. To reduce radiative heat transfer, each MLI panel disposed within cells of the CLRMLI generally includes multiple layers of low emissivity barriers. Solid heat conduction through the load supporting MLI panel and the face sheets is also reduced by including spacers or filler material having low thermal conductivity between adjacent layers. Under atmospheric conditions in which the outer face sheet of the CLRMLI panel may bow or bend, the spacers or filler material maintain separation between the outer face sheet and the layers of the MLI insulation panel, thereby preventing a thermal short between the outer face sheet and the MLI panel. As external pressure is reduced, the deflection of the outer face sheet may be reduced such that the outer face sheet no longer contacts the spacer, further reducing apparent thermal conductivity of the insulation structure.

The cellular structure of CLRMLI also improves reliability in comparison to other insulation systems. More specifically, because each of the cells and MLI panels are hermetically isolated, damage to a single cell and/or the MLI panel within the cell does not affect neighboring cells or their MLI panels.

Comparison of CLRMLI to conventional insulation materials demonstrates that CLRMLI significantly outperforms known alternatives. To compare insulation materials, the product of thermal conductivity and mass (k·m) is a useful metric in determining the relative efficiency of an insulation material in both atmospheric and in-space conditions. As shown in Table 1, CLRMLI provides significant benefits over competing insulation systems and superior performance for both in-atmosphere and in-space applications.

TABLE 1

|  | Aerogel | SOFI | CLRMLI |
| --- | --- | --- | --- |
| k [W/(m · K)] (in space) | 0.0012 | 0.021 | 0.0006 |
| k [W/(m · K)] (in air) | 0.019 | 0.021 | 0.0021 |
| Thickness [cm] | 2.54 | 2.54 | 1.5 |
| Area density [kg/m$^2$] | 1.30 | 0.8 | 2.07 |
| k · m [kg · W/(m · K)] (in air) | 24.61 | 16.80 | 4.35 |
| k · m [kg · W/(m · K)] (in space) | 1.55 | 16.80 | 1.35 |

As shown in Table 1, CLRMLI provides significantly higher insulation performance by weight as compared to both SOFI and aerogels and outperforms these insulation systems in both atmospheric and in-space conditions. Additionally, CLRMLI is impervious to water absorption and has high enough thermal performance to maintain the outer surface temperature above 273K, which eliminates surface frosting and reduces condensation in atmospheric conditions. The structure and materials used in CLRMLI are also capable of withstanding aerodynamic and aerothermal loads during launch.

The following embodiments and aspects thereof are described and illustrated in conjunction with systems, tools, materials and methods which are meant to be exemplary and illustrative, and not limiting in scope. In various embodiments, one or more of the above-described problems have been reduced or eliminated, while other embodiments are directed to additional improvements.

Figure 1B:
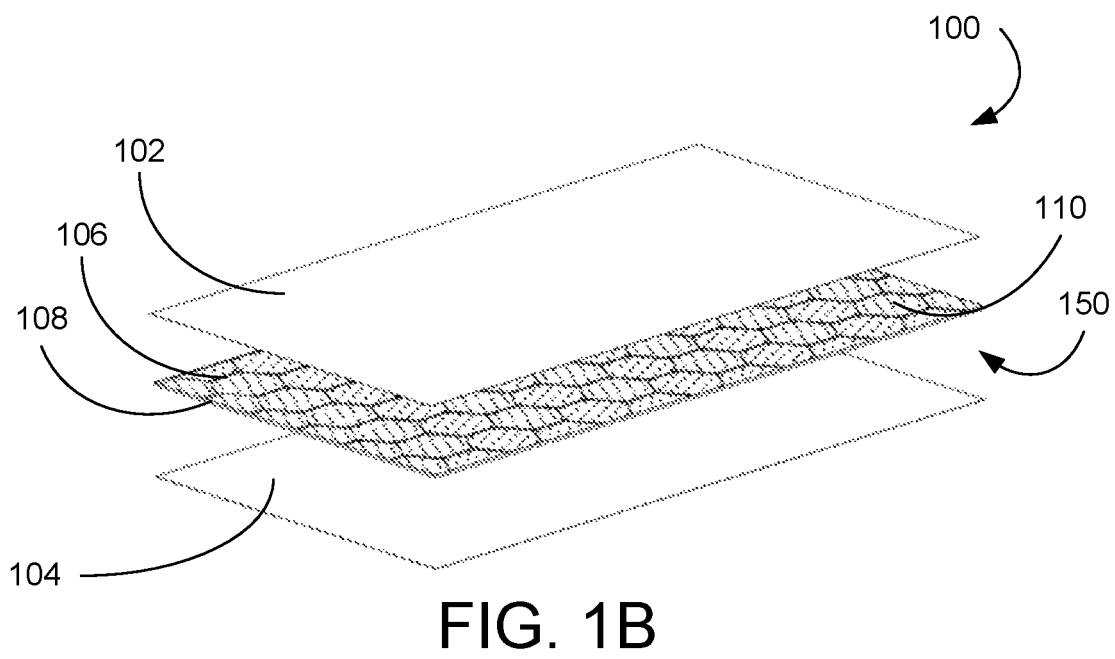
Figure 1C:
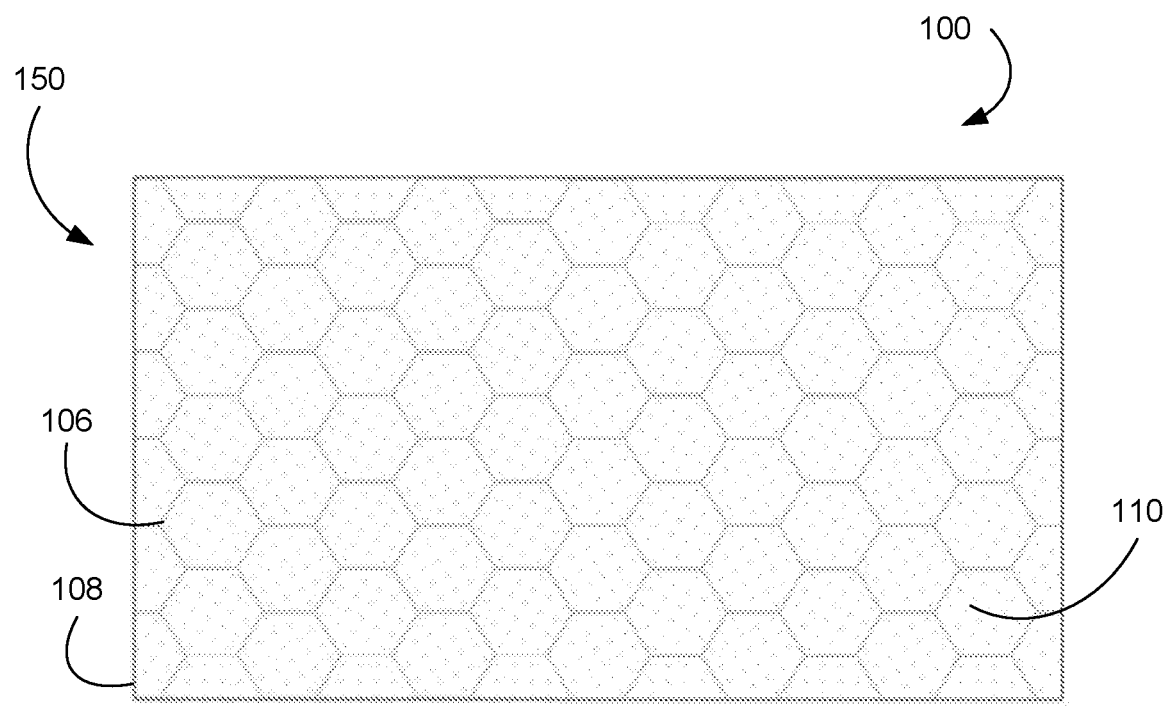
FIG. 1C is a top plan view of the first CLRMLI panel with a top face sheet removed.

FIGS. 1A-B are isometric exploded views of a cellular load-responsive multilayer insulation (CLRMLI) panel 100 in accordance with the present disclosure. The CLRMLI panel 100 includes an internal structure 150 including a cellular core structure 106 disposed between an outer face sheet 102 and an inner face sheet 104. FIG. 1C is a top plan view of the CLRMLI panel 100 with the outer face sheet 102 removed.

During assembly, the cellular core structure 106 is hermetically sealed to the outer face sheet 102 to define a plurality of cell bodies. Multilayer insulation (MLI) panels, such as MLI panel 110, are disposed within each of the cell bodies. The cell bodies are then coupled to a planar structure, which in the case of the CLRMLI panel 100 is the inner face sheet 104, to seal the plurality of cell bodies to form a plurality of enclosed contiguous cells (such as cell 107 shown in FIGS. 3, 5, and 6), each cell capable of holding a vacuum. In alternative embodiments, the inner face sheet 104 may be omitted and the planar structure for sealing the plurality of cell bodies may instead be a wall of the structure being insulated with the CLRMLI panel 100.

When the CLRMLI panel 100 is mounted to a tank or other structure to be insulated, the outer face sheet 102 is exposed while a bottom side of the inner face sheet 104 is in contact with the structure being insulated. The inner face sheet 104 may be formed of a material having relatively high thermal conductivity such as aluminum or a durable polymer film such as metalized PET or polyimide. Due to its exposure to the surrounding environment, the top sheet 102 may be formed of a more durable material such that the outer face sheet 102 is able to withstand both aerodynamic loading and aerothermal heating effects during exposed launch ascent. Example materials that may be used for the outer face sheet 102 include, without limitation, metalized polymer films, aluminum or other metal films, or laminated combinations thereof.

The cellular core structure 106 may be formed of a low thermally conductive polymeric or composite material such as polyimide, polyetherimide, polyamide or aramid polyamide composite structures. As illustrated in FIGS. 1A-B, the core structure 106 defines substantially hexagonal cells; however implementations of the present disclosure are not limited to hexagonal cell shapes. Other core structures may define cells having a shape other than a hexagonal shape and may, in certain implementations, include cells of multiple shapes defined by a single core structure. The core structure 106 is generally constructed to minimize thermal conduction through the panel 100 and to minimize gas permeation or leakage between adjacent cells defined by the core structure 106. In certain implementations, the core structure may include an edge closeout 108 that extends around the extent of the core structure 106 to close out the outer edges of the panel 100 and to minimize gas permeation through the outer edges from or to the external environment. The edge closeout 108 may be similar in material and construction to the core structure 106.

As previously noted, MLI panels, such as MLI panel 110, are disposed in each cell defined by the core structure 106. Each MLI panel is generally shaped to minimize gaps between the MLI panel and the core structure 106. The MLI panels may include spacers to separate layers of the MLI panels and to provide structural support to the CLRMLI panel 100. In certain implementations, the spacers may be dynamic load response spaces that may disconnect or otherwise disengage from one or more layers of the MLI panels or the CLRMLI panel 100 when the CLRMLI panel 100 is subject to low or no external load, such as when the CLRMLI panel 100 is exposed to in-space conditions. By doing so, thermal conduction between the layers of the CLRMLI panel 100 and the internal MLI panels are reduced for even higher thermal performance.

The CLRMLI 100 panel is generally formed by hermetically attaching each of the outer face sheet 102 and the inner face sheet 104 to the core structure 106 after insertion of the MLI panels into the core structure 106. Hermetic attachment may include, without limitation, one or more of bonding, fusing, or heat forming the outer face sheet 102 and the inner face sheet 104 to the core structure 106, including the edge closeout 108.

Insulation provided by the CLRMLI panel 100 may be further enhanced by forming a vacuum or near vacuum within the cells. In certain implementations, such pressures may be achieved by manufacturing or assembling the CLRMLI panel 100 in a vacuum or near vacuum environment. In other implementations, the front face sheet 102 may include ports or other features that enable coupling of the CLRMLI panel 100 to a vacuum pump or similar device for evacuating air from the interior of the CLRMLI panel 100 during or after assembly.

In still other implementations, a gas species may be introduced within each of the hermetically sealed cells during assembly to create self-evacuating cells. More specifically, gas may be introduced into the cells to cause the cells to function as cryopumps in which a vacuum or near vacuum forms in response to sufficiently low temperatures within the cells. As temperature within the cells drops due to contact between the inner face sheet 104 and the structure being insulated (which may be maintained at cryogenic or refrigerant temperatures below 233K), the gas within the cells condenses and/or freezes. Such condensation and freezing results in self-evacuation of the cells and may cause the pressure within the cells to drop to vacuum or near-vacuum levels (e.g., below $10^{-4}$ torr), improving the insulating properties of the internal MLI panels. Getter material may also be introduced into the cells defined by the core structure 106. The getter material may react with or adsorb gas particles within the cells to further decrease the pressure within the cells.

Figure 2A:
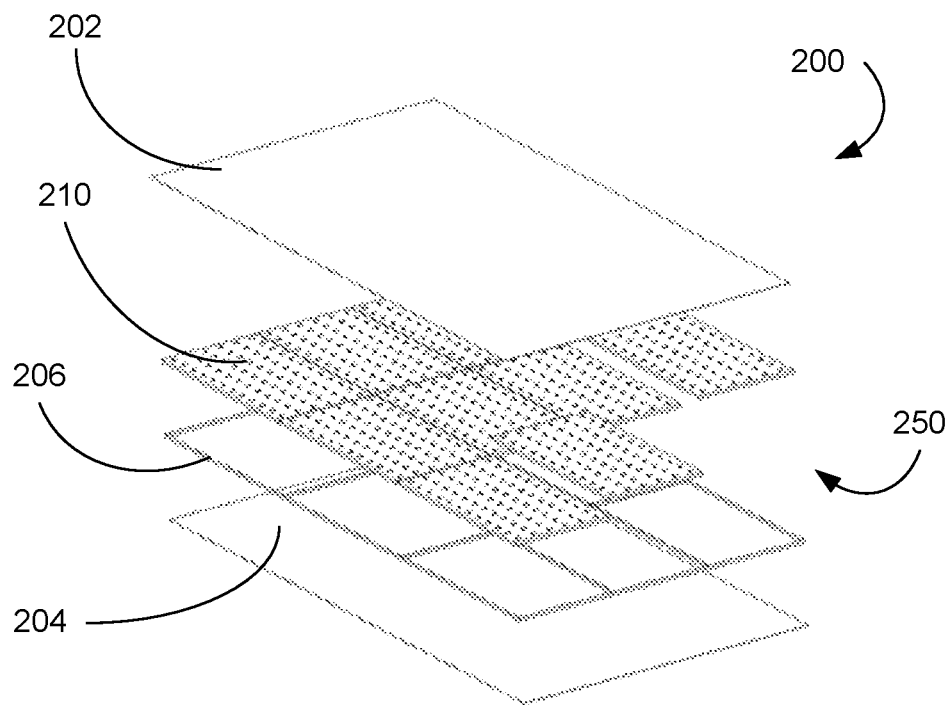
FIG. 2A is an isometric exploded view of a second CLRMLI panel according to the present disclosure.
Figure 2B:
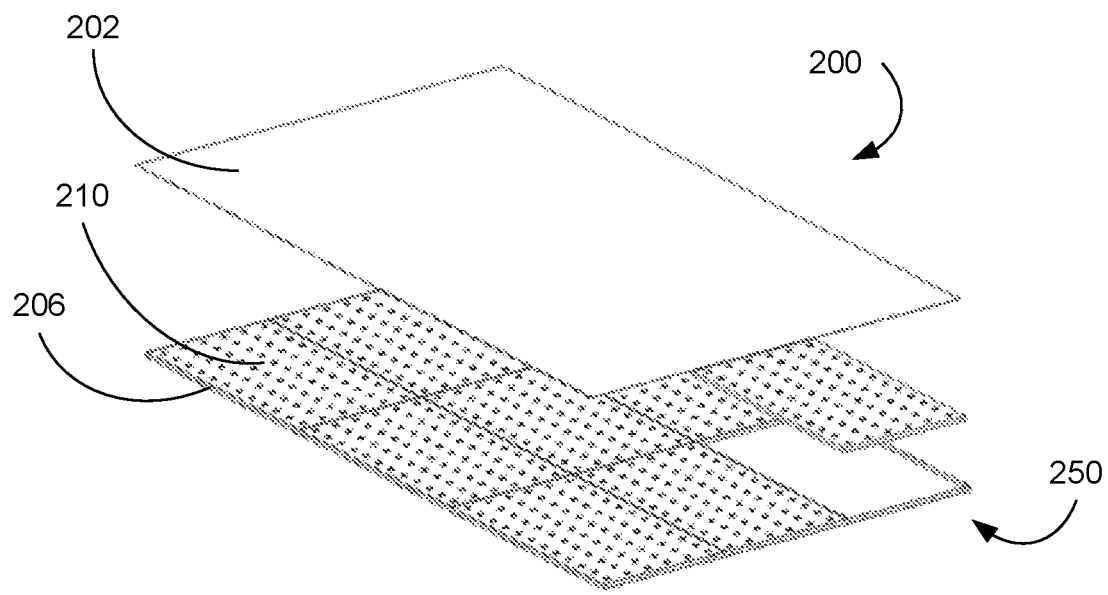
FIG. 2B is a second isometric exploded view of the second CLRMLI panel with a bottom face sheet removed.
Figure 2C:
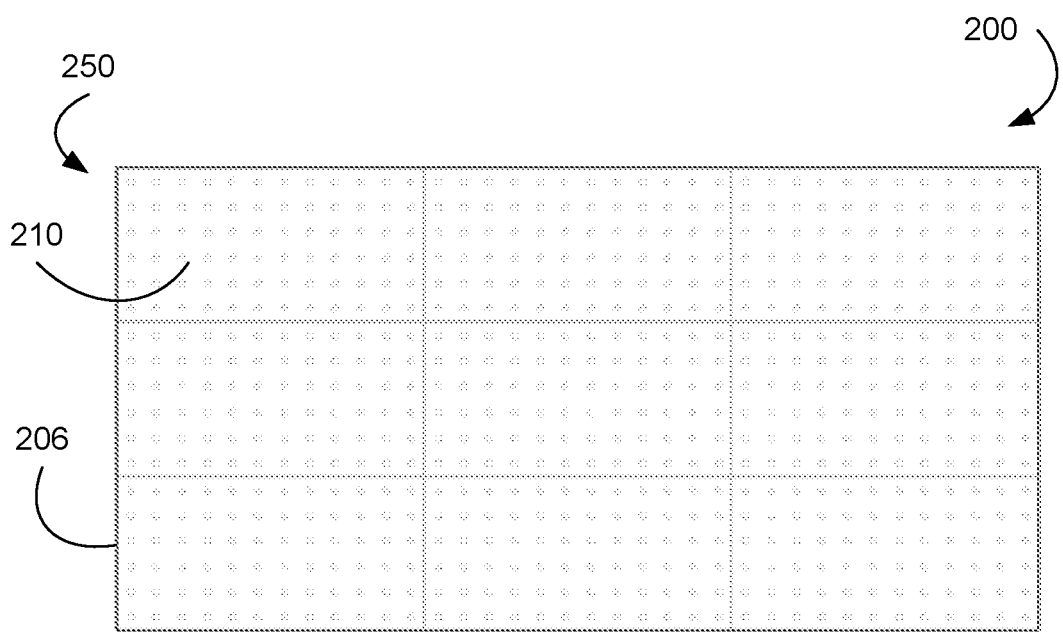
FIG. 2C is a top plan view of the second CLRMLI panel of FIGS. 2A-B with a top face sheet removed.

FIGS. 2A-B are isometric exploded views of a second CLRMLI panel 200 in accordance with the present disclosure. As shown in FIG. 2A, the CLRMLI panel 200 includes an internal structure 250 including a cellular core structure 206 hermetically coupled to an outer face sheet 202 to define a plurality of cell bodies. An inner face sheet 204 may also be coupled to the cellular core structure 206 opposite the outer face sheet 202 to form fully enclosed cells. FIG. 2C is a top plan view of the CLRMLI panel 200 with the outer face sheet 202 removed. MLI panels, such as MLI panel 210, are disposed within each of the cells. In contrast to the CLRMLI panel 100 of FIGS. 1A-B, the core structure 206 and corresponding cells and MLI panels of CLRMLI panel 200 have a rectangular shape. Accordingly, the need for a separate edge closeout (such as the edge closeout of FIGS. 1A-B) is eliminated.

The MLI panels may be constructed in any shape to conform to the individual cells defined by the core structure 206. Similar to the CLRMLI panel 100 of FIGS. 1A-B, the face sheets 202 and 204 may be hermetically attached to the core structure 206 such that gas may be evacuated from within the cells defined by the core structure 206 or a gas may be entrapped within the cells to facilitate cryopumping in self-evacuating embodiments. A getter may also be disposed within the cells defined by the core structure to further facilitate evacuation.

As illustrated in FIG. 2B, the inner face sheet 204 may be omitted from implementations of CLRMLI panels in accordance with the present disclosure. In such implementations, the CLRMLI panel 200 may be coupled directly to a tank or other structure being insulated. Such coupling includes hermetically sealing the core structure 206 to the underlying structure such that each cell of the CLRMLI panel 200 is individually sealed and isolated.

As previously noted, the internal structure 150 illustrated in FIGS. 1A-C generally includes a core structure 106 defining hexagonal cell bodies that may be sealed to define corresponding hexagonal cells (such as cell 107, shown in FIGS. 3, 5, and 6), into which corresponding hexagonal MLI panels, such as MLI panel 110, are inserted. Similarly, the internal structure 250 includes a core structure 206 defining rectangular cell bodies into which corresponding rectangular MLI panels, such as MLI panel 210, are inserted.

The cellular structure of the internal structures 150, 250 generally provides a degree of damage tolerance to CLRMLI panels in accordance with this disclosure. More specifically, the individual hermetically sealed cells generally preclude damage to one or more cells compromising the integrity of the entire CLRMLI panel. So, a rip or tear through a particular cell would generally result in failure of only the damaged cell due to the adjacent cells being hermetically sealed and isolated from the damaged cell and would not cause a decrease in the vacuum level or thermal performance of the adjacent cells.

As an example, a cryogenic tank for a launch vehicle may have a surface area of 1700 ft$^2$ and may be covered by multiple four foot-by-eight foot (32 ft$^2$) CLRMLI panels according to the rectangular cell embodiment illustrated in FIGS. 2A-C. In such an embodiment, ripping, tearing, or other damage to an individual cell, such as the cell 207, would result in a loss of only about 0.2% of the insulated area of the cryogenic tank. In contrast, damage to an equivalently sized non-cellular panel would result in a loss of approximately 1.8% of the insulated area of the cryogenic tank.

The foregoing losses may be further improved by decreasing the size and, as a result, increasing the number of cells of a given panel. For example, the CLRMLI panel 100 (shown in FIGS. 1A-C) includes significantly more cells than the CLRMLI panel 200 (shown in FIGS. 2A-C) and, as a result, damage or failure of any one cell of the CLRMLI panel 100 contributes to a lower total insulation loss as compared to a failure of a cell in the CLRMLI panel 200.

Although increasing the quantity and decreasing the size of cells in a CLRMLI panel according to this disclosure may contribute to improved damage tolerance, improved thermal properties may be achieved by having fewer and larger cells. In implementations having smaller and more numerous cells, such as the CLRMLI panel 100 of FIGS. 1A-C, the contact area between the core structure 106 and the face sheets 102, 104 is increased, thereby increasing the thermal paths extending through the CLRMLI panel 100. In contrast, CLRMLI panels having fewer but larger panels, such as the CLRMLI panel 200 of FIGS. 2A-C, result in fewer thermal paths through the CLRMLI 200 and, as a result, improved thermal performance. Accordingly, the quantity, shape, and size of internal cells of CLRMLI panels in accordance with the present disclosure may be adjusted to find a particular balance between damage tolerance and thermal performance based on the specific application in which such panels are being implemented.

Figure 3:
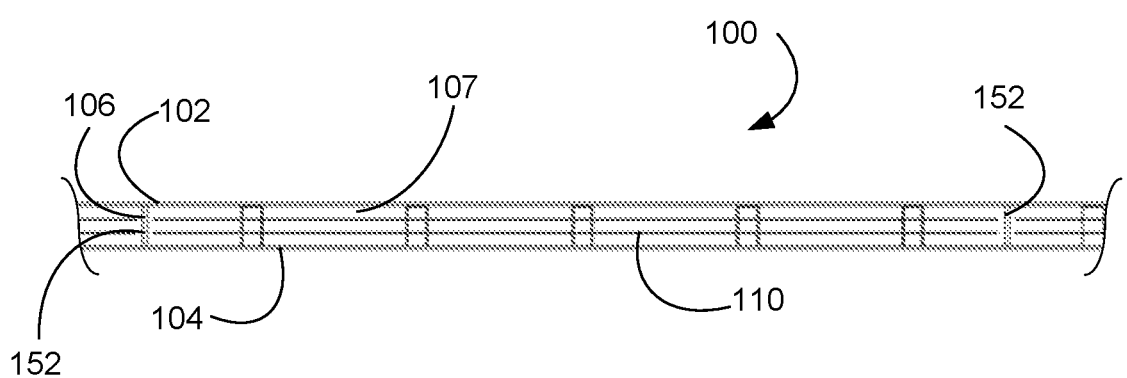
FIG. 3 is a cross-sectional view of the first CLRMLI panel.

FIG. 3 is a cross-sectional view of the CLRMLI panel 100 of FIGS. 1A-C. As shown in FIG. 3, the CLRMLI panel 100 includes a core structure 106 including a plurality of core walls 152 which define hermetically sealed cells, such as the cell 107. Each cell in turn includes an MLI panel disposed therein, such as the MLI panel 110. As shown in FIG. 3 and as previously discussed, each MLI panel is isolated within its respective cell by hermetically sealing the outer face sheet 102 and the inner face sheet 104 to the core structure 106. Alternatively, the inner face sheet 104 may be omitted and the CLRMLI panel 100 may be directly hermetically sealed to the underlying structure to be insulated.

Figure 4A:
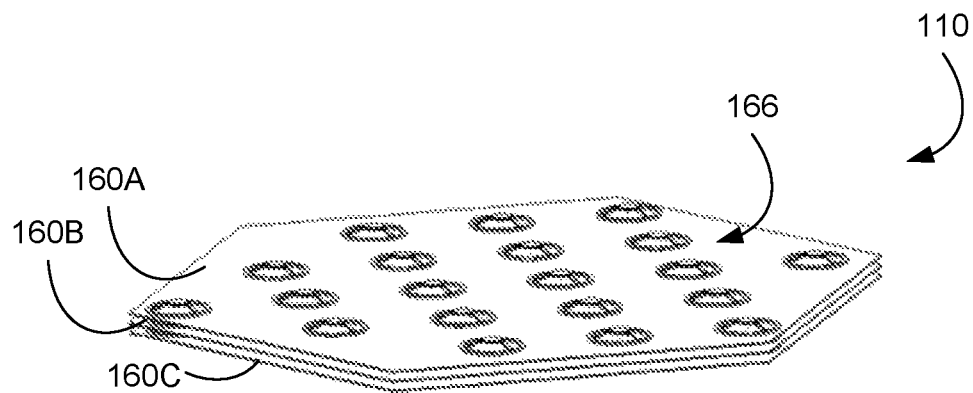
FIGS. 4A-B are an isometric view and an exploded view, respectively, of a multilayer insulation (MLI) panel of the first CLRMLI panel.
Figure 4B:
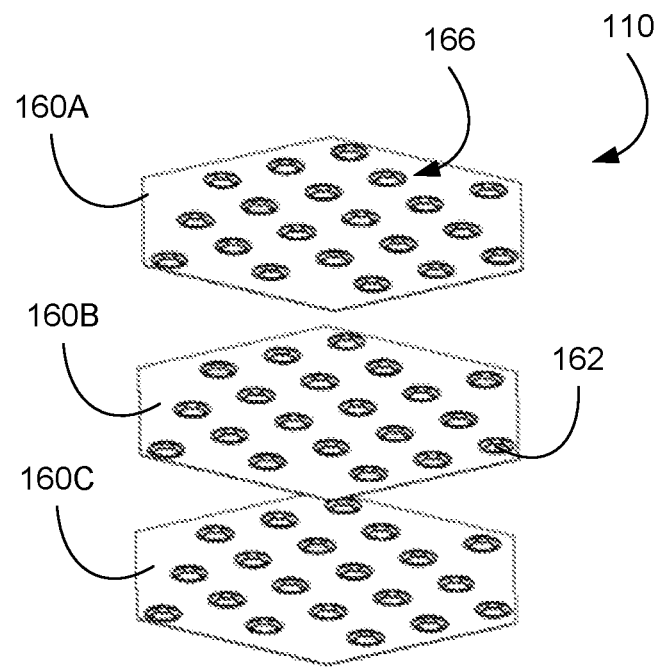

FIG. 4A is an isometric view of the MLI panel 110 of FIGS. 1A-C. FIG. 4B is an isometric exploded view of the MLI panel 110 showing further detail.

The MLI panel 110 includes multiple low emissivity radiant barrier layers 160A-C, separated and supported by low thermally conductive dynamic load responsive spacers, such as spacer 162. The spacers create a separation between the radiant barrier layers 160A-C which minimize heat flux through the MLI panel 110. A top layer of spacers 166 may also be included to provide separation between the MLI panel 110 and the outer face sheet 102.

Additional details regarding spacers that may be used to provide separation in CLRMLI panels according to this disclosure and, in particular, MLI panels included in CLRMLI panels according to the present disclosure, are also discussed in further detail in U.S. patent application Ser. No. 14/743,278 to Dye, et al., filed Jun. 18, 2015, and entitled "Low Thermally Conductive Spacer for Hot and Cold Feedline Insulation" and U.S. Pat. No. 8,234,835 to Dye, et al., filed Jun. 29, 2009, and entitled "Integrated Multilayer Insulation", each of which is incorporated herein by reference.

FIG. 5 is a cross-sectional view of the CLRMLI panel 100 as coupled to a structure 10, which may be a cryogenic or refrigerated tank or vessel. As shown in FIG. 5, the CLRMLI panel 100 includes a core structure 106 including core walls 152A, B that define a hermetically isolated cell 107. A structural MLI panel 110 is contained within the cell 107 and supports the outer face sheet 102. Within the hermetically isolated cell 107 a gas species 154 is trapped. This gas species 154 may have a relatively high freezing point, a low solid phase vapor pressure, a high coefficient of adsorption, or all of these properties. A getter material 156 may also be disposed within the cell 107.

As shown in FIG. 5, the panel 100 is attached to the structure 10 such that the inner face sheet 104 is in direct contact with the structure 10. The panel 100 may be coupled to the structure 10 in various ways including, without limitation, one or more of bonding, bolting, riveting, and welding to ensure structural integrity and good thermal contact between the structure 10 and the panel 100. Alternatively, the inner face sheet 104 of the panel 100 may be omitted and the panel 100 may be hermetically coupled directly to the structure 10.

As previously noted the MLI panel 110 is contained within the cell 107 and includes multiple radiant barrier layers 160A-D separated by low thermally conductive spacers, such as the spacer 162. As illustrated in FIG. 5, additional spacers may also be disposed between the uppermost radiant barrier 160A of the MLI panel 110 and the outer face sheet 102 and between the inner face sheet 104 and the innermost radiant barrier 160D such that separation is also provided the MLI panel 110 and the outer and inner face sheets 102, 104. The separation between the radiant barrier layers 160A-C and the outer and inner face sheets 102, 104 creates an interstitial space for containing the gas species 154.

As the structure 10 is chilled, the temperature within the cell 107 similarly falls by virtue of contact between the panel 100 and the structure 10. When sufficiently cooled, the molecules of the gas species 154 within the cell 107 begin to condense or freeze onto the inner face sheet 104. In implementations in which the inner face sheet 104 is omitted, condensation and freezing may occur directly on the structure 10. As the gas molecules form into a condensate 170, a vacuum cryopumping process occurs within the cell 107 such that pressure within the cell 107 reduces to a vacuum or near vacuum.

A getter material 156, such as activated carbon or a molecular sieve that increases the surface area for condensation, may also be provided within the cell 107 to molecularly adsorb gas molecules within the cell 107. Such a getter 156 may be particularly useful in facilitating evacuation of the cell 107 in applications involving higher temperature cryogenic materials such as LOX, LCH4, or LNG, for which cryopumping may only provide a limited pressure reduction within the cell 107.

Once a vacuum level within the cell 107 drops below a predetermined range (e.g., below $10^{-4}$ torr), gas conduction and convection within the cell 107 is substantially eliminated and heat flux through the CLRMLI panel 100 is limited to radiation and solid conduction through structures of the CLRMLI panel 100. The radiation mode of heat transfer through the CLRMLI panel 100 is reduced by the multiple radiant barriers 160A-D of the MLI panel 110. Solid conduction is generally minimized through use of the spacers disposed between layers of the MLI panel 110 and between the MLI panel 110 and the face sheets 102, 104, which provide load-responsive structural support, thereby allowing use of very thin cell walls 152 and outer face sheet 102. Solid conduction is further reduced by using low thermally conductive materials to form the core structure 106.

FIG. 5 generally corresponds to a cross-sectional view of the CLRMLI panel 100 when the CLRMLI panel 100 and underlying structure 10 are disposed in a low pressure/near vacuum environment, such as space. Accordingly, the pressure within the CLRMLI panel 100 is substantially equal to the pressure outside of the CLRMLI panel 100 and a minimal net force is acting on the outer face sheet 102.

Figure 6:
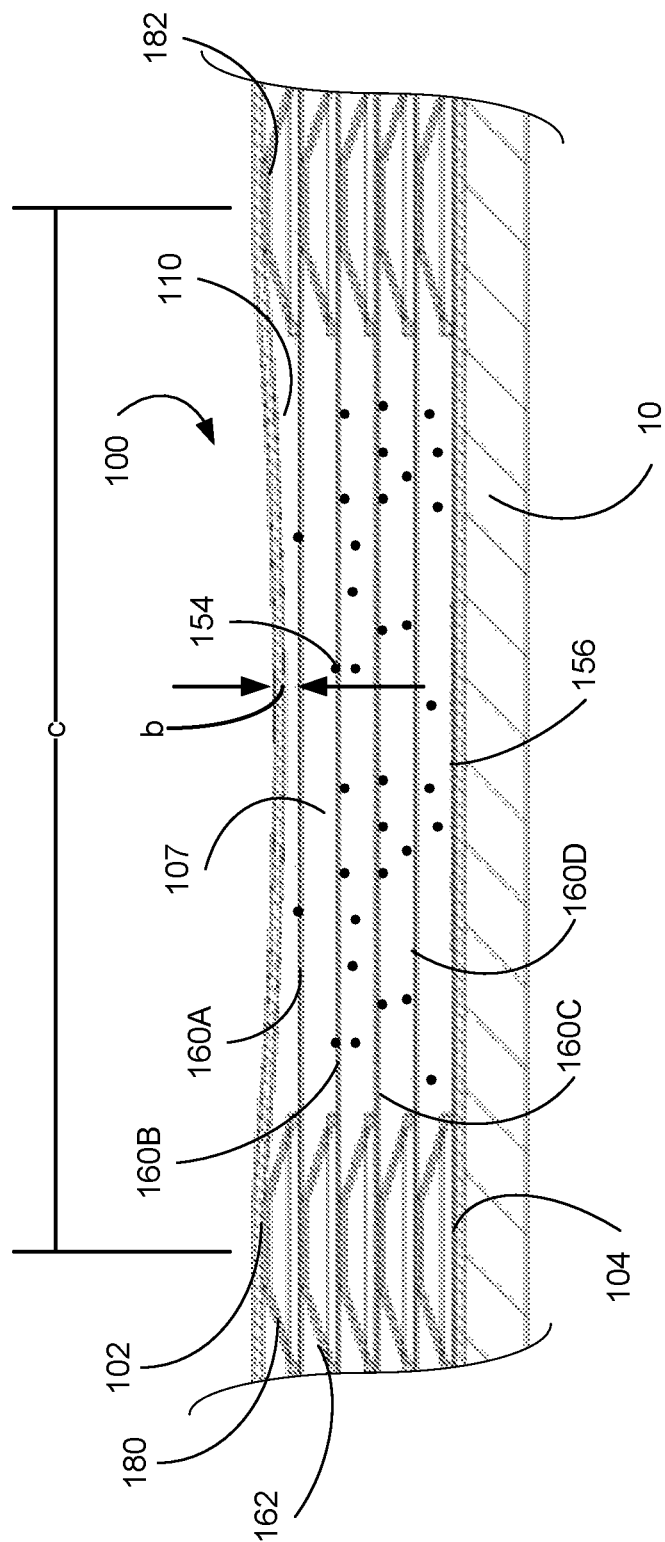
FIG. 6 is a cross-sectional view of the first CLRMLI panel coupled to a structure with the top face sheet in a loaded state.

In contrast, FIG. 6 is a detailed cross-sectional view of the CLRMLI panel 100 and underlying structure 10 when disposed in an atmospheric environment. Such a condition may occur, for example, prior to launch when the structure 10 is cooled due to containing cryogenic propellant. As illustrated, mechanical evacuation or self-evacuation caused by cryopumping causes the pressure within each cell of the panel 100 to be at or near vacuum such that a net positive pressure of approximately 1 atmosphere (15 psi) acts on the outer face sheet 102. To account for this differential pressure, spacers, such as spacers 180, 182, disposed between the outer radiant barrier layer 160A and the outer face sheet 102, may be positioned at a distance c from one another to support the outer face sheet 102. Accordingly, as pressure acts on the outer face sheet 102, the outer face sheet 102 deflects such that the initial separation between the outer face sheet 102 and the outermost radiant barrier layer 160A will change from a first distance a (shown in FIG. 5) to a final distance b (shown in FIG. 6). The stiffness of the face sheet and the spacing of the spacers 180,182 prevent the outer face sheet 102 from touching the outermost radiant barrier 160A. Supporting the outer face sheet 102 through the spacers 180, 182 enables much larger cell sizes (as compared to cells in which the outer face sheet is supported only by the core structure 106), thus enabling significant reduction in the solid thermal conduction through the CLRMLI panel 100.

Figure 7:
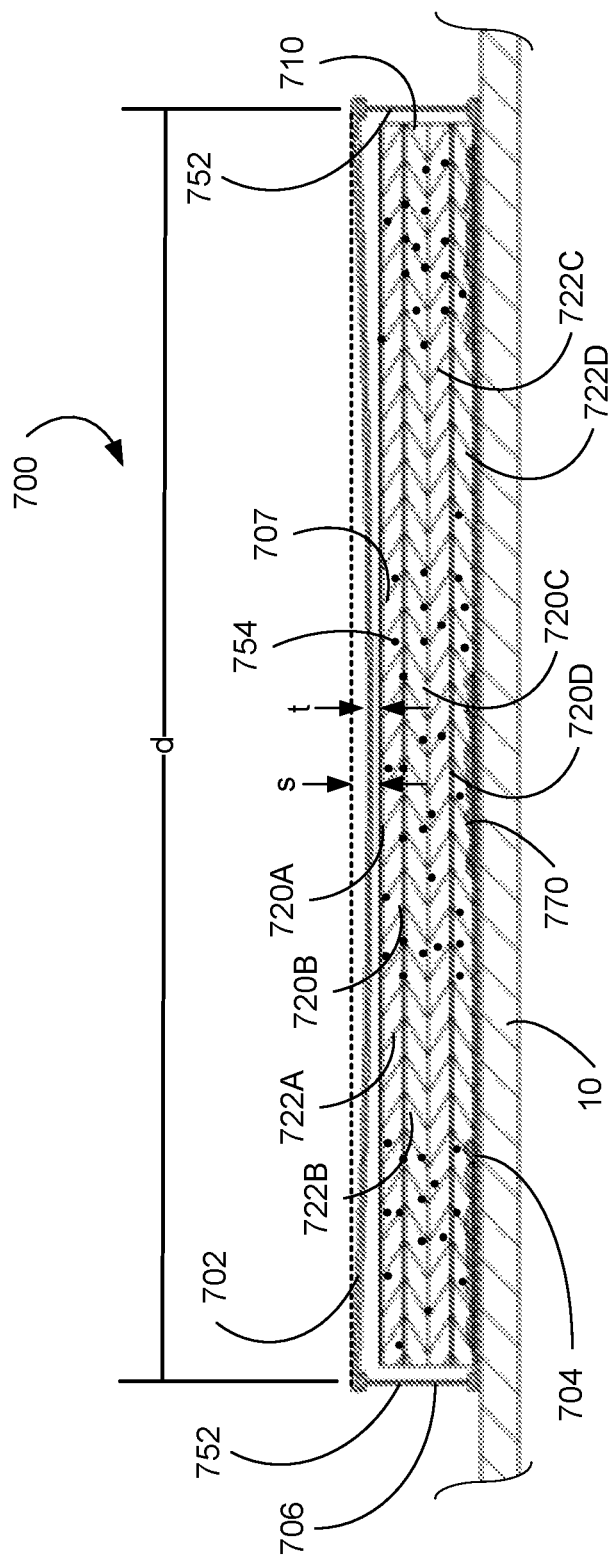
FIG. 7 is a cross-sectional view of a third CLRMLI panel coupled to a structure.

FIG. 7 is a cross-sectional view of another embodiment of a CLRMLI panel 700. The CLRMLI panel 700 is coupled to a structure 10, such as a tank or vessel, and includes each an outer face sheet 702 and an inner face 704. The outer face sheet 702 and the inner face sheet 704 are hermetically attached to a core structure 706 and define a cell 707. Disposed within the cell 707 is an MLI panel 710.

The MLI panel 710 includes multiple radiant barrier layers 720A-D. In contrast to the discrete spacers of the previous embodiments, the MLI panel 710 includes spacers 722A-D formed from a continuous filler material and disposed between adjacent radiant barrier layers 720A-D and between the innermost radiant barrier layer 720D and the inner face sheet 704, the spaces 722A-D. The filler material is generally selected to have low thermal conductivity and low outgassing. Example filler materials include, without limitation, polymeric netting, glass fiber, cotton wool, silica, pearlite, and reticulated foams.

As shown in FIG. 7, the MLI panel 710 does not directly support the top face sheet 702. Rather, the top face sheet 702 is supported by the walls 752 of the core structure 706. The outer face sheet 702 may also be formed from a relatively stiff and strong material such as, without limitation, aluminum, stainless steel, titanium, or a carbon fiber composite and may be made durable enough to be exposed to both the aerodynamic loading and the aero thermal heating effects during launch ascent. The maximum cell size d may be determined by the strength of the outer face sheet 702 spanning the cell 707.

The material used for the spacers 722A-D may be of open cellular structure or have vent paths and open space to allow a gas species 754 disposed within the cell 707 to flow within the interstitial spaces between the radiant barrier layers 720A-C. This allows molecules of the gas species 754 to flow freely through the cell 707 and to form a condensate 770 on the inner face sheet 704 (or structure 10 in embodiments without an inner face sheet 704) as the cell 707 is cooled.

In operation, as atmospheric pressure acts on the outer surface of the outer face sheet 702, the outer face sheet 702 deflects from a natural or resting distance s (defined as the distance between the outermost radiant barrier layer 720A and the outer face sheet 702 when the internal pressure of the cell 707 is substantially equal to an external pressure) to a deflected distance t (defined as the minimum distance between the outermost radiant barrier layer 720A and the outer face sheet 702 when the external pressure exceeds the internal pressure of the cell 707 by approximately one atmosphere). The outer face sheet 702 is designed such that the distance t is greater than zero such that the outer face sheet 702 does not touch the outermost radiant barrier layer 720A under atmospheric conditions.

Figure 8A:
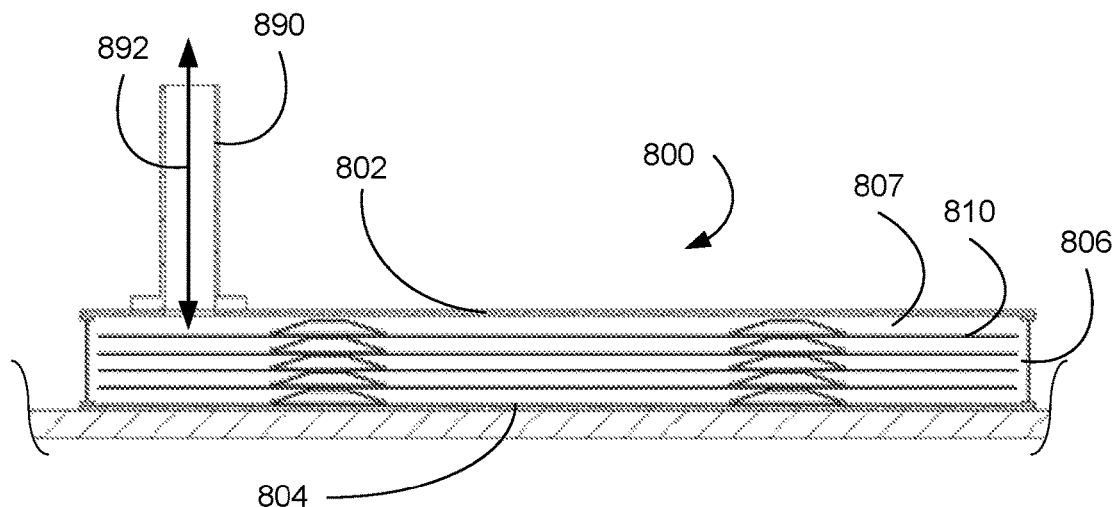
FIGS. 8A-B are cross-sectional views of a fourth CLRMLI panel coupled to a structure, the fourth CLRMLI panel having a port in an unsealed and sealed configuration, respectively.
Figure 8B:
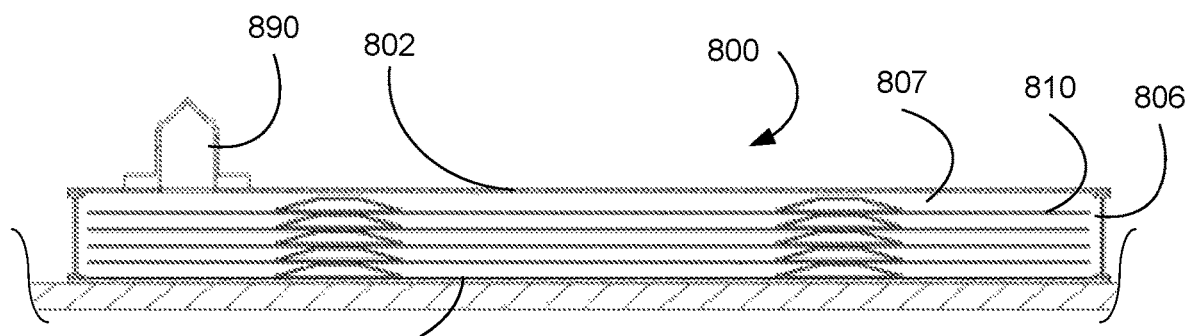

FIGS. 8A and 8B are cross-sectional views of an alternative CLRMLI panel 800 according to the present disclosure. The CLRMLI panel 800 includes an outer face sheet 802 and an inner face sheet 804 that are hermetically coupled to a core structure 806 to define a plurality of cells, such as cell 807, which contain respective MLI panels, such as MLI panel 810. For purposes of the following discussion, the cell 807 is considered to be representative of each of the plurality of cells of the CLRMLI panel 800.

As shown in FIG. 8A, a dedicated pumpout port 890 extends from the outer face sheet 802 to define a path 892 extending into the cell 807. The pumpout port 890 is hermetically sealed to the outward face sheet 802 and is generally adapted to be coupled to a vacuum pump to mechanically evacuate the internal volume of the cell 807. As illustrated in FIG. 8B, after the cell 807 is evacuated, the pumpout port 890 may be hermetically crimped, such as by cold welding. The pumpout port 890 is illustrated in FIGS. 8A-B as a simple tube; however, a self-sealing valve may be used instead. Alternatively, CLRMLI panels in accordance with the present disclosure may be hermetically sealed within a vacuum chamber during manufacture, thereby eliminating the need for pumpout ports.

Figure 9A:
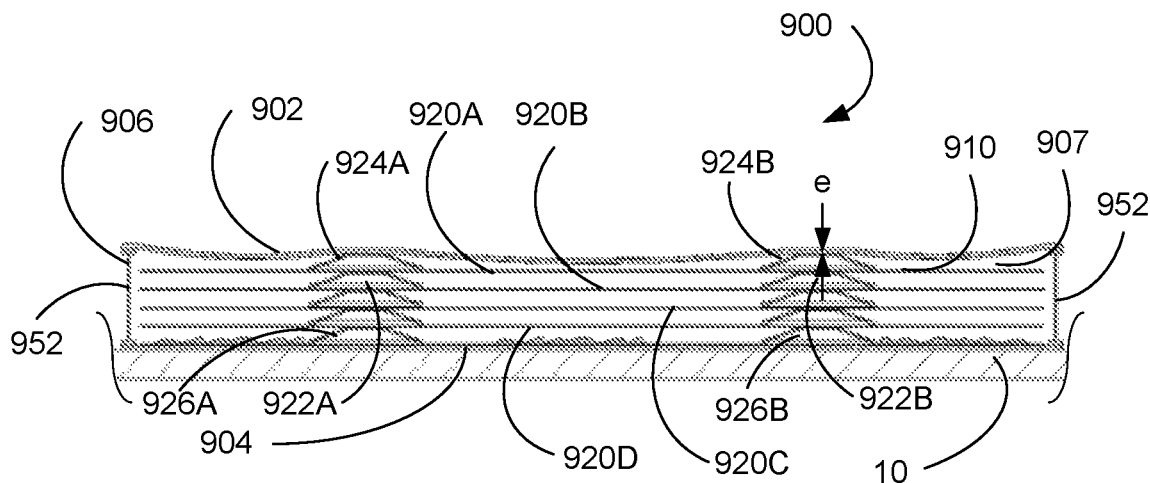
FIGS. 9A-B are cross-sectional views of a fifth CLRMLI panel coupled to a structure in a loaded and unloaded state, respectively.
Figure 9B:
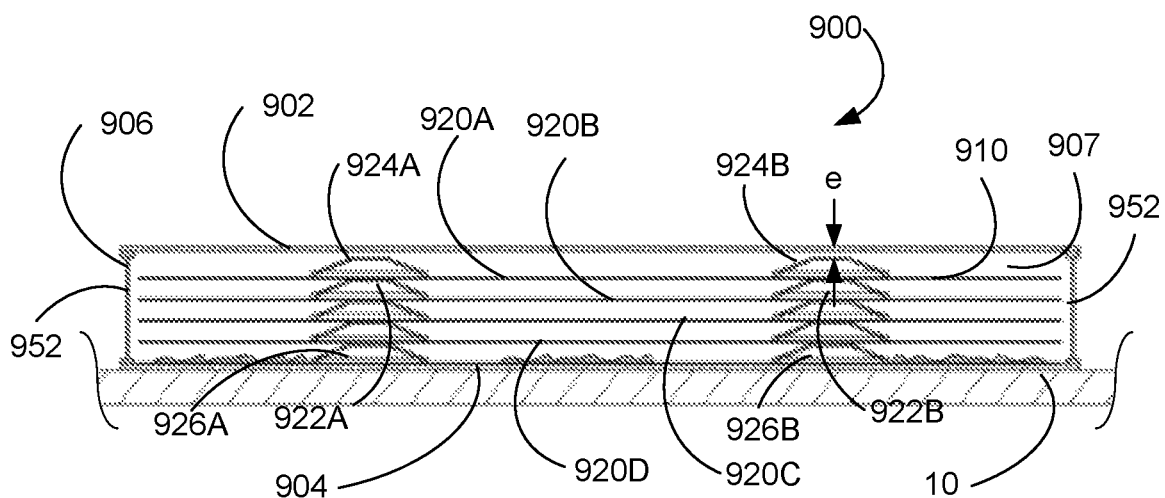

FIGS. 9A and 9B are cross-sectional views of an alternative CLRMLI panel 900 according to the present disclosure. The CLRMLI panel 900 includes an outer face sheet 902 and an inner face sheet 904 that are hermetically coupled to walls 952 of a core structure 906 to define a plurality of cells, such as cell 907, which contain respective MLI panels, such as MLI panel 910. For purposes of the following discussion, the cell 907 is considered to be representative of each of the plurality of cells of the CLRMLI panel 900.

As shown in each of FIGS. 9A and 9B, the MLI panel 910 includes multiple radiant barrier layers 920A-D. Adjacent radiant barrier layers 920A-D are separated by spacers, such as spacers 922A, B. Spacers are further disposed between the MLI panel 910 and the face sheets 902, 904. For example, outer spacers 924A, B may be disposed on the outer radiant barrier layer 920A between the outer radiant barrier layer 920A and the outer face sheet 902. Similarly, inner spacers 926A, B may also be included between the inner face sheet 904 and the inner radiant barrier layer 920D.

FIG. 9A illustrates the CLRMLI panel 900 with a differential pressure acting upon the outer face sheet 902. Such conditions may arise, for example, prior to launch when a vacuum or near vacuum is formed within the cell 907 but the exterior of the CLRMLI panel 900 is exposed to atmospheric conditions such that the outer face sheet 902 is subjected to a net load of approximately one atmosphere. As a result of the load applied to the outer face sheet 902, the outer face sheet 902 may deflect inward. As illustrated in FIG. 9A, in the presence of a differential pressure across the outer face sheet 902, the outer face sheet 902 contacts the outer spacers 924A, B but is prevented by the outer spaces 924A, B from directly contacting the outer radiant barrier layer 920A. Accordingly, the outer face sheet 902 is supported by both the walls 952 of the core structure 906 and the spacers of the MLI panel 910, each of which forms a path for thermal conduction between the outer face sheet 902 and the inner face sheet 904. Referring to FIG. 9A, for example, a dimension e is provided that is defined as the minimum distance between the outer face sheet 902 and the MLI panel 910. In the state illustrated in FIG. 9A, e is zero indicating direct contact between the outer face sheet 902 and the MLI panel 910 such that solid conduction occurs through the MLI panel 910. To reduce such conduction, each of the spacers of the MLI panel 910, and the walls 952 may be formed from materials having low thermal conductivity.

In contrast to FIG. 9A, FIG. 9B illustrates the CLRMLI panel 900 is in a condition in which a differential pressure does not exist or is otherwise nominal across the outer face sheet 902. Such conditions may occur in space when the pressure within the cell 907 is reduced due to cryopumping or other evacuation and the external pressure around the CLRMLI panel 900 is substantially at vacuum. Under such conditions, the net load on the outer face sheet 902 is effectively zero such that the top face sheet 902 does not deflect towards the MLI panel 910 and, as a result, does not contact the outer spacers 924A, B. In this condition, the outer face sheet 902 is supported only by the walls 952 of the core structure 906 and, as a result, thermal conduction occurs only through the walls 952. In other words, when a low or negligible differential pressure occurs across the outer face sheet 902, e is driven above zero such that solid conduction occurs only through the walls 952. This lowers the apparent thermal conductivity of the CLRMLI panel 900 and significantly reduces heat leak and cryogen boil off in space as compared to heat leak and boil off in atmospheric conditions.

Figure 10A:
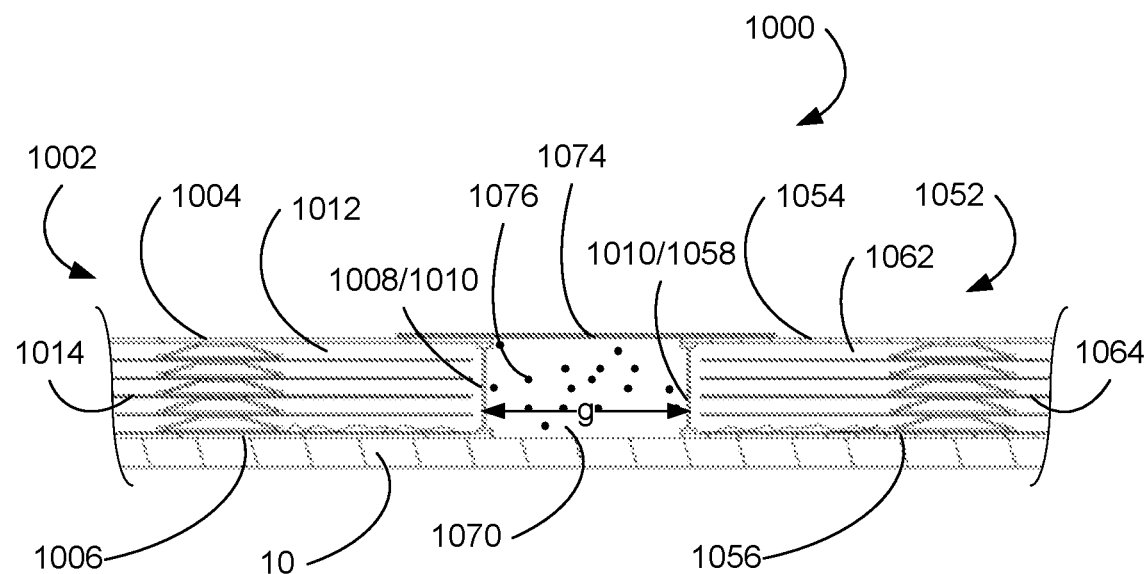
FIGS. 10A-B are cross-sectional views of a seamed CLRMLI assembly in an uncooled and cooled state, respectively.
Figure 10B:
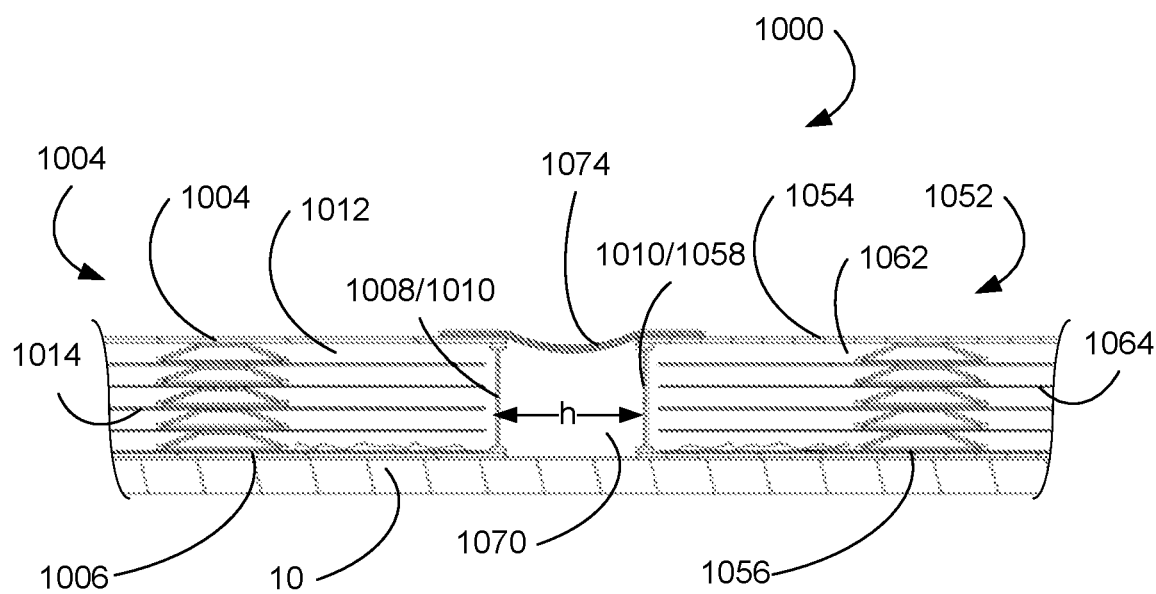

FIGS. 10A and 10B are cross-sectional views of a CLRMLI assembly 1000 according to the present disclosure. The CLRMLI assembly 1000 includes a first CLRMLI panel 1002 and a second CLRMLI panel 1052 which are coupled to a structure 10 and which define a gap 1070 therebetween. The first CLRMLI panel 1002 generally includes a first outer face sheet 1004 and a first inner face sheet 1006 that are hermetically coupled to first walls 1008 of a core structure 1010 to define a first cell 1012 containing a first MLI panel 1014. Similarly, the second CLRMLI panel 1052 includes a second outer face sheet 1054 and a second inner face sheet 1056 that are hermetically coupled to second walls 1058 of the core structure 1010 to define a second cell 1062 including a second MLI panel 1064.

In the implementation of FIGS. 10A-B, the gap 1070 allows for contraction of the structure 10 in response to cooling of the structure 10 and accounts for mismatches between the coefficient of thermal expansion of the structure 10 and the CLRMLI panels 1002, 1052. During manufacturing, a predetermined gas species 1076 may be injected or otherwise provided into the gap 1070 which is subsequently covered by a seam face sheet 1074 that is hermetically sealed (such as by bonding, welding, fusing, or other method) to the first outer face sheet 1004 and the second outer face sheet 1054 over the gap 1070. Depending on the temperature of the structure 10, the preferred gas species 1076 may include, without limitation, one of air, nitrogen, argon, and $CO_2$. The seam face sheet 1074 may be made of a low permeability material such as, without limitation, a metalized polymer or a thin metal film.

As illustrated in FIG. 10B, as the structure 10 is exposed to a cryogen or refrigerant fluid, the structure 10 and CLRMLI assembly 1000 begin to cool. In certain implementations, such cooling initiates a cryopumping process within the CLRMLI panels 1002, 1052 to further reduce the pressure within each of the cells 1012, 1062. A cryopumping process may also occur within the gap 1070 as molecules of the gas species 1076 cool and condense/freeze onto the structure 10, thereby creating a vacuum or near vacuum within the gap 1070. Cryopumping within the gap 1070 also reduces frosting on the exterior surface of the seam sheet 1074. As the structure 10 and CLRMLI assembly 1000 cool, thermal contraction may occur and the structure 10 and/or components of the CLRMLI assembly 1000 may begin to shrink, reducing the width of the gap 1070 from g (as shown in FIG. 10A) to a second width h. To accommodate such contraction, the seam face sheet 1074 is generally compliant but durable enough to withstand exposure to aerodynamic and aerothermal loading during launch ascent. Example materials that may be used for the seam face sheet 1074 include, without limitation, metalized polymer films, aluminum or other metal films, or laminated combinations thereof.

Figure 11:
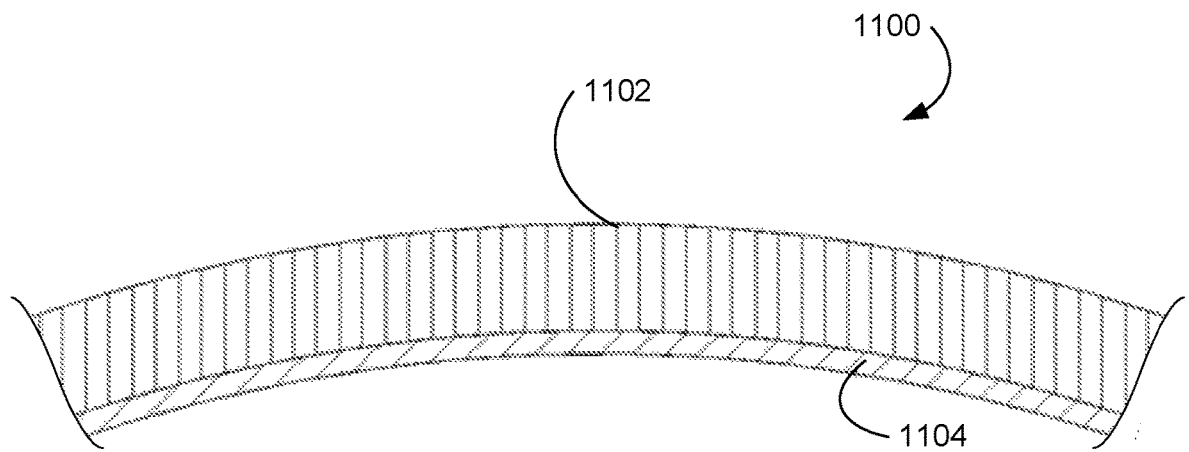
FIG. 11 is a cross-sectional view of a first assembly including a CLRMLI panel coupled to a curved structure.
Figure 12:
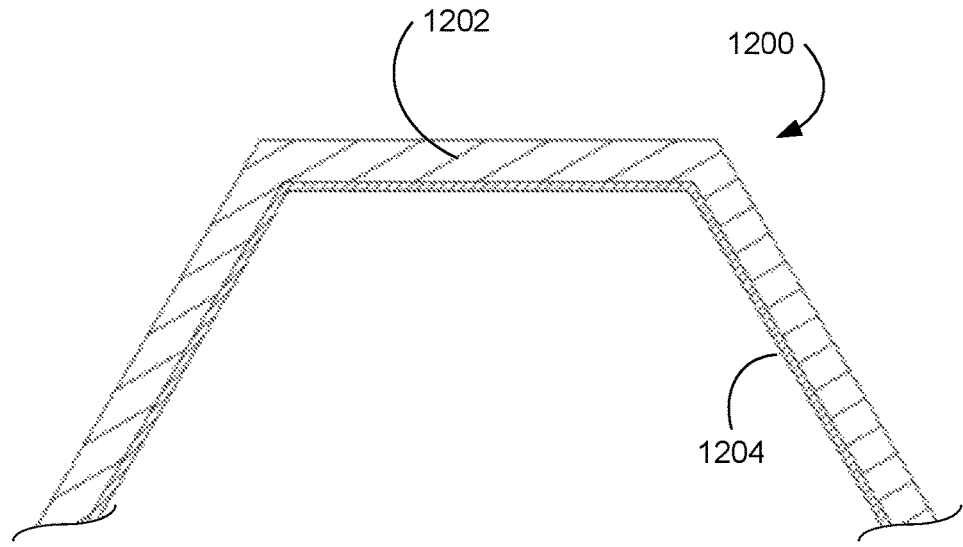
FIG. 12 is a cross-sectional view of a second assembly including a CLRMLI panel coupled to an angled or faceted structure.

Although illustrated in the foregoing discussion and figures as being applied to a substantially flat structure surface, CLRMLI panels in accordance with the present disclosure may be shaped to conform to other structure shapes. FIG. 11, for example, is a cross-sectional view of an application 1100 in which a CLRMLI panel 1102 is coupled to a curved structure 1104, such as a cylindrical or spherical tank or vessel. As another example, FIG. 12 is a cross-sectional view of a second application 1200 in which a CLRMLI panel 1202 is coupled to an angular or faceted structure 1204. Other structure shapes may be accommodated by CLRMLI panels in accordance with this disclosure provided the CLRMLI panel maintains direct contact with the outer surface of the structure when installed.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. An insulation panel comprising:
   a first face sheet;
   a plurality of structural walls hermetically coupled with the first face sheet, the plurality of structural walls in combination with a respective portion of the first face sheet defining a plurality of cell bodies, with each cell body positioned contiguously with an adjacent cell body; and
   an insulation structure within each of the plurality of cell bodies, the insulation structure comprising:
      a first radiant barrier layer;
      a second radiant barrier layer; and
      a first spacer disposed between the first radiant barrier layer and the second radiant barrier layer.

2. The insulation panel of claim 1 further comprising a planar structure hermetically coupled with the plurality of structural walls on an opposing side of the first face sheet, the plurality of structural walls in combination with a respective portion of the planar structure sealing the plurality of cell bodies to form a plurality of enclosed contiguous cells each capable of holding a vacuum.

3. The insulation panel of claim 2, wherein the planar structure is a second face sheet or a wall of a structure to be insulated.

4. The insulation panel of claim 2, wherein each of the plurality of enclosed contiguous cells contain a gas selected to at least one of condense and freeze in response to cryogenic cooling of a surface to which the insulation panel is coupled.

5. The insulation panel of claim 4, wherein the gas is selected from a group consisting of air, nitrogen, argon, carbon dioxide.

6. The insulation panel of claim 2 further comprising a getter disposed within each of the plurality of enclosed contiguous cells, the getter selected to adsorb gas particles within the plurality of cell bodies.

7. The insulation panel of claim 1, wherein the plurality of structural walls are composed of one or more of polyimide, polyetherimde, polyamide, and aramid polyamide.

8. The insulation panel of claim 1, wherein the first face sheet is composed of at least one of aluminum, a polymer film, metalized polyethylene terephthalate (PET), and polyimide.

9. The insulation panel of claim 7 further comprising a second spacer disposed between the first radiant barrier layer and the first face sheet, wherein the second spacer contacts each of the first radiant barrier layer and the first face sheet when a first external pressure is applied to the first face sheet and the second spacer contacts only the first radiant barrier layer when a second external pressure, less than the first external pressure, is applied to the first face sheet.

10. The insulation panel of claim 1, further comprising a plurality of hermetically sealable ports coupled to the first face sheet, each of the plurality of hermetically sealable ports in communication with a respective cell body.

11. The insulation panel of claim 1, wherein the first spacer is one of a plurality of discrete spacers disposed between the first radiant barrier layer and the second radiant barrier layer.

12. The insulation panel of claim 1, wherein the first spacer is a continuous fill material disposed between the first radiant barrier layer and the second radiant barrier layer.

13. An insulated structure comprising:
a structure wall; and
a first insulation panel coupled to the structure wall, the first insulation panel comprising:
a first face sheet;
a plurality of structural walls hermetically coupled with the first face sheet, the plurality of structural walls in combination with a respective portion of the first face sheet defining a plurality of cell bodies, with each cell body positioned contiguously with an adjacent cell body; and
an insulation structure within each of the plurality of cell bodies, the insulation structure comprising:
a first radiant barrier layer;
a second radiant barrier layer; and
a first spacer disposed between the first radiant barrier layer and the second radiant barrier layer.

14. The insulated structure of claim 13 further comprising:
a second insulation panel coupled to the structure wall, the second insulation panel comprising a second face sheet, the first insulation panel and the second insulation panel forming a gap therebetween; and
a face seam sheet hermetically coupled to each of the first insulation panel and the second insulation panel and extending across the gap to define a hermetically sealed volume.

15. The insulated structure of claim 14, wherein the hermetically sealed volume contains a gas selected to condense or freeze within the hermetically sealed volume in response to cryogenic cooling of the structure wall.

16. The insulated structure of claim 14, wherein the face seam sheet is shaped to deflect into the gap in response to thermal contraction of at least one of the first insulation panel, the second insulation panel, and the structure wall.

17. An insulation panel comprising:
a structural core defining a contiguous plurality of hermetically sealed cells; and
a first radiant barrier layer disposed within each of the hermetically sealed cells,
wherein each of the hermetically sealed cells contains gas selected to at least one of condense and freeze in response to cryogenic cooling of a structure to which the insulation panel is coupled, thereby causing self-evacuation of the respective hermetically sealed cell.

18. The insulation panel of claim 17, wherein the gas is selected from a group consisting of air, nitrogen, argon, carbon dioxide.

19. The insulation panel of claim 17, further comprising a second radiant barrier layer disposed within each of the hermetically sealed cells, the first radiant barrier layer and the second radiant barrier layer separated by a spacer.

20. The insulation panel of claim 17, wherein the structural core comprises an outer face sheet, the insulation panel comprising a spacer disposed between the radiant barrier layer and the outer face sheet.

* * * * *